United States Patent
Schwartz (10) Patent No.: US 10,126,884 B2
(45) Date of Patent: Nov. 13, 2018

(54) ASYNCHRONOUS INTERFERENCE DETECTION IN A CAPACITIVE SENSING SYSTEM

(71) Applicant: Synaptics Incorporated, San Jose, CA (US)

(72) Inventor: Adam Schwartz, Redwood City, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 239 days.

(21) Appl. No.: 14/579,533

(22) Filed: Dec. 22, 2014

(65) Prior Publication Data

US 2016/0179243 A1 Jun. 23, 2016

(51) Int. Cl.
| | |
|---|---|
| *G01R 27/26* | (2006.01) |
| *G01R 13/00* | (2006.01) |
| *G06F 3/03* | (2006.01) |
| *G06F 3/041* | (2006.01) |
| *G06F 3/044* | (2006.01) |
| *G06F 3/045* | (2006.01) |
| *G06F 3/0354* | (2013.01) |

(52) U.S. Cl.
CPC .......... *G06F 3/044* (2013.01); *G06F 3/03547* (2013.01); *G06F 3/0416* (2013.01); *G06F 3/0418* (2013.01)

(58) Field of Classification Search
CPC ..... G01R 27/2605; G01R 13/00; G06F 3/044; G06F 3/045; G06F 3/03; G06F 3/033; G06F 3/041
USPC ............... 345/173–178; 324/686; 178/18.01, 178/18.03, 18.06
See application file for complete search history.

(56) References Cited

U.S. PATENT DOCUMENTS

| | | | | |
|---|---|---|---|---|
| 4,504,786 | A | * | 3/1985 | Slaughter ............... G01R 23/16 324/76.17 |
| 6,301,312 | B1 | | 10/2001 | Limberg |
| 7,432,751 | B2 | | 10/2008 | Fang |
| 8,352,202 | B2 | | 1/2013 | Hargreaves |

(Continued)

OTHER PUBLICATIONS

PCT/2015/064101, International Search Report and Written Opinion of the International Searching Authority, dated Apr. 14, 2016, consists of 10 pages.

(Continued)

*Primary Examiner* — Neel Shah
(74) *Attorney, Agent, or Firm* — Patterson + Sheridan, LLP (57) ABSTRACT

In an example, a processing system for a capacitive sensing device includes a sensor module and a determination module. The sensor module comprises a receiver, coupled to a sensor electrode, configured to receive a capacitive sensing signal. The receiver includes an in-phase channel and a quadrature channel. The in-phase channel is configured to mix the capacitive sensing signal with a local oscillator signal substantially in phase with the capacitive sensing signal. The quadrature channel is configured to mix the capacitive sensing signal with a phase-shifted signal near ninety degrees out of phase with the capacitive sensing signal. The determination module is configured to measure a change in capacitance in response to a demodulated signal of the in-phase channel concurrently with measuring a non-coherent signal in response to a demodulated signal of the quadrature channel.

15 Claims, 5 Drawing Sheets

(56) References Cited

U.S. PATENT DOCUMENTS

| | | |
|---|---|---|
| 8,493,360 B2 | 7/2013 | Kremin et al. |
| 8,730,204 B2 | 5/2014 | Washburn et al. |
| 8,743,080 B2 | 6/2014 | Hargreaves et al. |
| 8,810,537 B2 | 8/2014 | Yousefpor et al. |
| 8,847,899 B2 | 9/2014 | Washburn et al. |
| 2009/0160461 A1* | 6/2009 | Zangl .................... G01D 5/24 324/684 |
| 2010/0151900 A1* | 6/2010 | Koli .................... G11C 27/024 455/550.1 |
| 2011/0063993 A1* | 3/2011 | Wilson .................... G06F 3/044 370/254 |
| 2012/0056841 A1* | 3/2012 | Krenik .................... G06F 3/044 345/174 |
| 2012/0068966 A1* | 3/2012 | Washburn ............... G06F 3/044 345/174 |
| 2012/0229415 A1 | 9/2012 | Schwartz et al. |
| 2013/0207906 A1* | 8/2013 | Yousefpor ............. G06F 3/0418 345/173 |
| 2014/0327644 A1* | 11/2014 | Mohindra ............... G06F 3/044 345/174 |
| 2015/0236878 A1* | 8/2015 | Okuhata ............. H04L 25/0262 455/209 |
| 2015/0276976 A1* | 10/2015 | Holenarsipur ........... G01V 8/00 250/338.1 |

OTHER PUBLICATIONS

PCT International Preliminary Report on Patentability PCT/US2015/064101 dated Jul. 6, 2017, consists of 8 pages.

\* cited by examiner

ASYNCHRONOUS INTERFERENCE DETECTION IN A CAPACITIVE SENSING SYSTEM

BACKGROUND

Field of the Disclosure

Embodiments generally relate to input sensing and, in particular, to asynchronous interference detection in a capacitive sensing system.

Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location, and/or motion of one or more input objects. Input objects can be at or near the surface of the proximity sensor device ("touch sensing") or hovering over the surface of the proximity sensor device ("proximity sensing" or "hover sensing"). Proximity sensor devices may be used to provide interfaces for the electronic system. For example, proximity sensor devices are often used as input devices for larger computing systems (such as touchpads integrated in, or peripheral to, notebook or desktop computers). Proximity sensor devices are also often used in smaller computing systems (such as touch screens integrated in cellular phones or tablet computers).

SUMMARY

Embodiments relate to asynchronous interference detection in a capacitive sensing system. In an embodiment, a processing system for a capacitive sensing device includes a sensor module and a determination module. The sensor module comprises a receiver, coupled to a sensor electrode, configured to receive a capacitive sensing signal. The receiver includes an in-phase channel and a quadrature channel. The in-phase channel is configured to mix the capacitive sensing signal with a local oscillator signal substantially in phase with the capacitive sensing signal. The quadrature channel is configured to mix the capacitive sensing signal with a phase-shifted signal near ninety degrees out of phase with the capacitive sensing signal. The determination module is configured to measure a change in capacitance in response to a demodulated signal of the in-phase channel concurrently with measuring a non-coherent signal in response to a demodulated signal of the quadrature channel.

In another embodiment, an input device comprises a plurality of sensor electrodes and a processing system. The processing system is coupled to the plurality of sensor electrodes. The processing system is configured to: receive capacitive sensing signals; mix the capacitive sensing signals with a local oscillator signal substantially in-phase with the capacitive sensing signal to generate in-phase demodulated signals; mix the capacitive sensing signals with a phase-shifted signal near ninety degrees out of phase with the capacitive sensing signals to generate quadrature demodulated signals; measure changes in capacitance in response to the in-phase demodulated signals; and measure non-coherent signals in response to the quadrature demodulated signals.

In another embodiment, a method of operating a capacitive sensing device having a plurality of sensor electrodes includes: receiving capacitive sensing signals derived from the plurality of sensor electrodes; mixing the capacitive sensing signals with a local oscillator signal substantially in-phase with the capacitive sensing signal to generate in-phase demodulated signals; mixing the capacitive sensing signals with a phase-shifted signal near ninety degrees out of phase with the capacitive sensing signals to generate quadrature demodulated signals; measuring changes in capacitance in response to the in-phase demodulated signals; and measuring non-coherent signals in response to the quadrature demodulated signals.

BRIEF DESCRIPTION OF THE DRAWINGS

So that the manner in which the above recited features of embodiments can be understood in detail, a more particular description of embodiments, briefly summarized above, may be had by reference to embodiments, some of which are illustrated in the appended drawings. It is to be noted, however, that the appended drawings illustrate only typical embodiments and are therefore not to be considered limiting of scope, for other equally effective embodiments may be admitted.

To facilitate understanding, identical reference numerals have been used, where possible, to designate identical elements that are common to the figures. It is contemplated that elements of one embodiment may be beneficially incorporated in other embodiments.

DETAILED DESCRIPTION

The following detailed description is merely exemplary in nature and is not intended to limit the embodiments or the application and uses of such embodiments. Furthermore, there is no intention to be bound by any expressed or implied theory presented in the preceding technical field, background, brief summary or the following detailed description.

Various embodiments relate to asynchronous interference detection in a capacitive sensing system. Receivers in the system are configured to perform both in-phase and quadrature demodulation of capacitive sensing signals derived from operation of sensor electrodes at a sensing frequency. The sensor electrodes can be operated to detect input object(s) by detecting changes mutual capacitance between electrodes or changes in self-capacitance of electrodes. In-phase channels are demodulated using a local oscillator signal substantially in-phase with the capacitive sensing signals. Quadrature channels are demodulated using a phase-shifted signal near ninety degrees out of phase with the capacitive sensing signals. In a steady-state condition, the in-phase channels include the "desired" signals that can be used for capacitive sensing of the input object(s) (coherent signals). Any signals detected on the quadrature channels are, by construction, asynchronous with the desired signal (non-coherent signals). Hence, measuring signals on the quadrature channels is tantamount to making a direct interference measurement.

The capacitive sensing system can take actions to mitigate interference by measuring the non-coherent signals. In addition, the coherent and non-coherent signals are generated concurrently, and hence the capacitive sensing system can sense for input objects and interference concurrently. This avoids having to detect interference in short time periods between capacitive sensing frames, where such techniques can miss detecting interference that is only occurring during the sensing cycle and take away from the time for capacitive sensing. By sensing for input object(s) and interference concurrently as described herein, the time periods between sensing cycles can be reduced and used for other purposes, or eliminated. These and further aspects are described further below.

Figure 1:
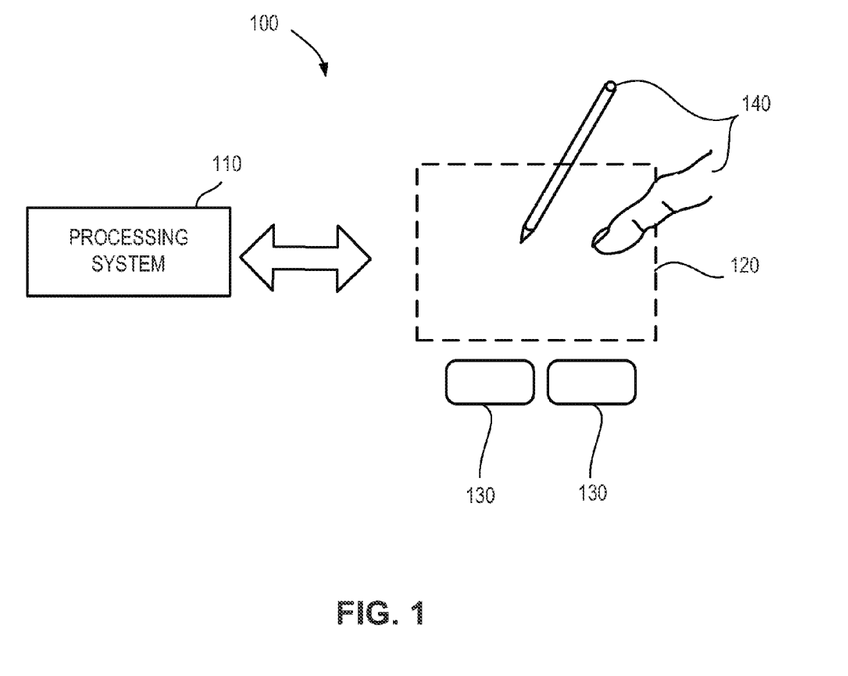
FIG. 1 is a block diagram of a system that includes an input device according to an example implementation.

Turning now to the figures, FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
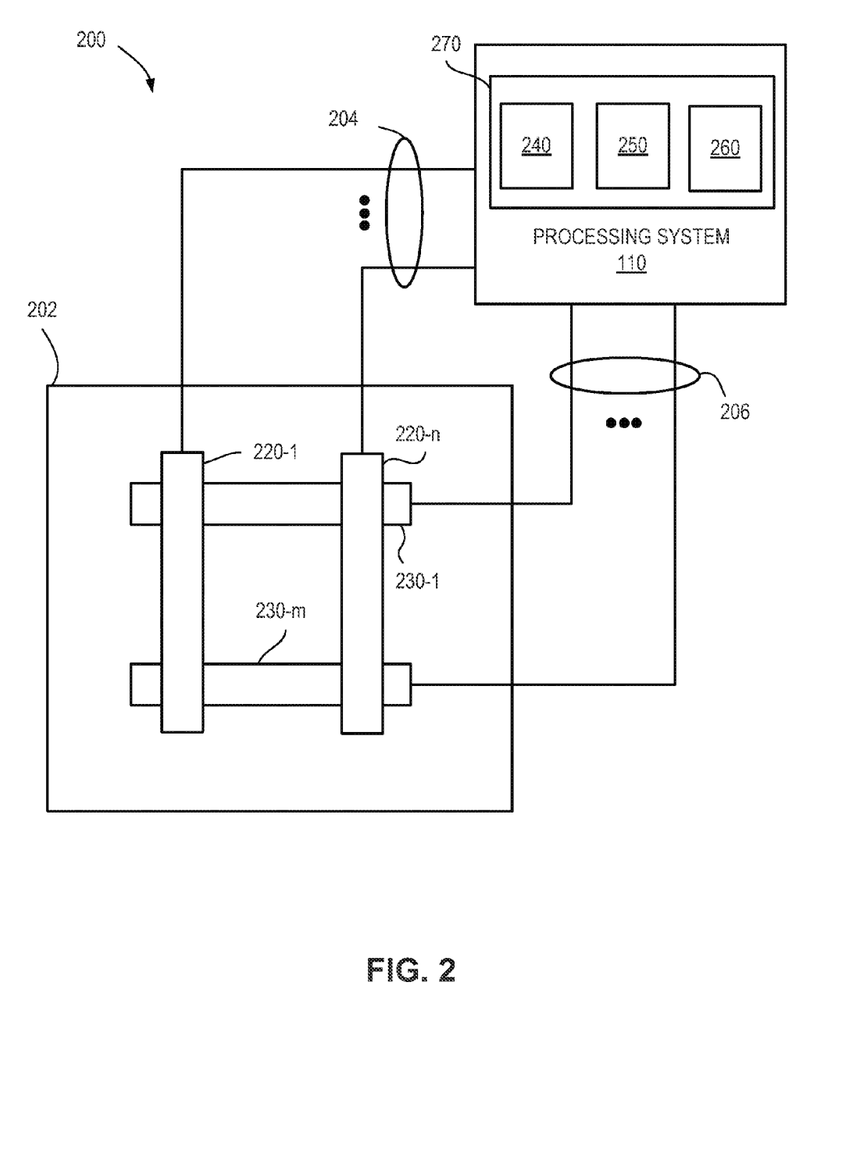
FIG. 2 is a block diagram depicting a capacitive sensor device according to an example implementation.

FIG. 2 is a block diagram depicting a capacitive sensor device 200 according to an embodiment. The capacitive sensor device 200 comprises an example implementation of the input device 100 shown in FIG. 1. The capacitive sensor device 200 includes sensor electrodes disposed on the substrate 202. In the present example, the sensor electrodes include two pluralities of sensor electrodes 220-1 through 220-$n$ (collectively "sensor electrodes 220", and 230-1 through 230-$m$ (collectively "sensor electrodes 230"), where m and n are integers greater than zero. The sensor electrodes 220 and 230 are separated by a dielectric (not shown).

In some examples, the sensor electrodes 220 and the sensor electrodes 230 can be disposed on separate layers of the substrate 202. In other examples, the sensor electrodes 220 and the sensor electrodes 230 can be disposed on a single layer of the substrate 202. The electrodes 210 can be on the same and/or different layers as the sensor electrodes 220 and the sensor electrodes 230. While the sensor electrodes are shown disposed on a single substrate 202, in some embodiments, the sensor electrodes can be disposed on more than one substrate. For example, some sensor electrodes can be disposed on a first substrate, and other sensor electrodes can be disposed on a second substrate adhered to the first substrate. The sensor electrodes 220, 230 can have the same or different widths, sizes and/or shapes.

In the present example, the sensor electrode pattern is shown with the sensor electrodes 220, 230 arranged in an x/y grid of bars and strips. It is to be understood that the sensor electrode pattern is not limited to such bars and stripes arrangement, but instead can include numerous sensor patterns. For example, the sensor electrodes on the substrate 202 can be arranged in a matrix pattern of sensor electrodes surrounded by a grid electrode. Although the sensor electrode pattern is depicted as rectangular, the sensor electrode pattern can have other shapes, such as a circular shape.

The sensor electrodes 220 and 230 are coupled to the processing system 110 by conductive routing traces 204, 206. When in operation, the processing system 110 is coupled to the sensor electrodes 220, 230 through the conductive routing traces 204, 206 to implement the sensing region 120 for sensing inputs. In an embodiment, each set of sensor electrodes can have a dedicated function. For example, the sensor electrodes 230 can transmit transmitter signals generated by the processing system 110 or another device under control of the processing system 110. The processing system 110 can receive resulting signals with the sensor electrodes 220. In such an embodiment, the sensor electrodes 230 are "transmitter electrodes" and the sensor electrodes 220 are "receiver electrodes." In some embodiments, one or more of the sensor electrodes 220 may be measured to sense self-capacitance (absolute capacitance). In another embodiment, the sets of sensor electrodes do not have a dedicated function (undifferentiated electrodes) and the sensor electrodes 230 can function as either transmitter electrodes or receiver electrodes, and the sensor electrodes 220 can function as either receiver electrodes or transmitter electrodes.

The processing system 110 can include one or more modules, such as a sensor module 240, a control module 250, and a determination module 260. The sensor module 240, the control module 250, and the determination module 260 comprise modules that perform different functions of the processing system 110. In other examples, different configurations of modules can perform the functions described herein. The sensor module 240, the control module 250, and the determination module 260 can include sensor circuitry 270 and can also include firmware, software, or a combination thereof operating in cooperation with the sensor circuitry 270.

In an embodiment, the sensor module 240 can excite or drive sensor electrodes with signals. The terms "excite" and "drive" as used herein encompasses controlling some electrical aspect of the driven element. For example, it is possible to drive current through a wire, drive charge into a conductor, drive a substantially constant or varying voltage waveform onto an electrode, etc. The sensor module 204 can drive a sensor electrode using a modulated signal generally having a shape, frequency, amplitude, and phase. The sensor module 204 can also measure some electrical aspect of a driven element indicative of capacitance (e.g., charge, voltage, current). The sensor module 204 can drive a sensor electrode and then measure changes of capacitive load on the sensor electrode (i.e., changes in absolute capacitance). The sensor module 204 can drive a transmitter electrode to transmit a transmitter signal and then measure changes in mutual capacitance from a resulting signal on a receiver electrode (i.e., changes in transcapacitance). In general, the sensor module 240 obtains capacitive sensing signals derived from operating the sensor electrodes for either transcapacitive sensing or absolute capacitive sensing.

The control module 250 controls the sensor module 240 and the determination module 260. The control module 250 can implement various capacitive sensing modes, such as transcapacitive sensing, absolute capacitive sensing, and interference sensing. Notably, as described herein, interference sensing can be performed concurrently with capacitive sensing. The control module 250 can control various aspects of the sensor module 240, such as the sensing frequency, the sensing cycle, transmitter firing, receiver operation, and the like. The control module 250 can control the determination module 260 to determine various types of information, such as a capacitive baseline, changes in capacitance, positional information for input object(s), interference information, and the like. While the processing system 110 is shown as having a separate control module 250, in other embodiments, all or a portion of the functions described as being performed by the control module 250 can instead be performed by one or more other modules. For example, in some embodiments, the control module 250 is omitted and the sensor module 240 or the determination module 260 can be configured to individually, or in combination, perform the functions of the control module 250.

The sensor module 240 generates measurements of some characteristic of the capacitive sensing signals, such as voltage, current, charge, or the like. The determination module 260 receives the measurements from the sensor module 240. The determination module 260 derives information from the measurements. For example, the determination module 260 can determine a baseline capacitance for the sensor electrode pattern, determine changes in mutual capacitance between sensor electrodes and/or changes in self-capacitance of sensor electrodes, and compare changes in capacitance with the baseline to detect object presence, position, motion, etc. The changes in capacitance can be associated with specific locations of the sensing region 120 to create a "capacitive image" or "capacitive frame." The changes in capacitance can be associated with a specific axis of the sensing region 120 to create a "capacitive profile" along that axis. When compensated with the baseline, the capacitive image(s) and/or capacitive profile(s) enable the sensing of contact, hovering, or other user input with respect to the formed sensing regions by the sensor electrode pattern. The determination module 260 can determine positional information, size, type, and the like of input object(s).

The determination module 260 and the control module 250 can cooperate to detect and mitigate interference. The determination module 260 can detect interference from the measurements generated by the sensor module 240. The determination module 260 can measure interference to mitigate its effects on capacitive measurements. The control module 250 can enable or disable interference mitigation based at least in part on the interference measurements. For example, if the interference measurements indicate the presence of noise above a certain threshold, the control module 250 can implement a high-noise mode. If the interference measurements indicate the presence of noise below a certain threshold, the control module 250 can disable the high-noise mode.

Figure 3:
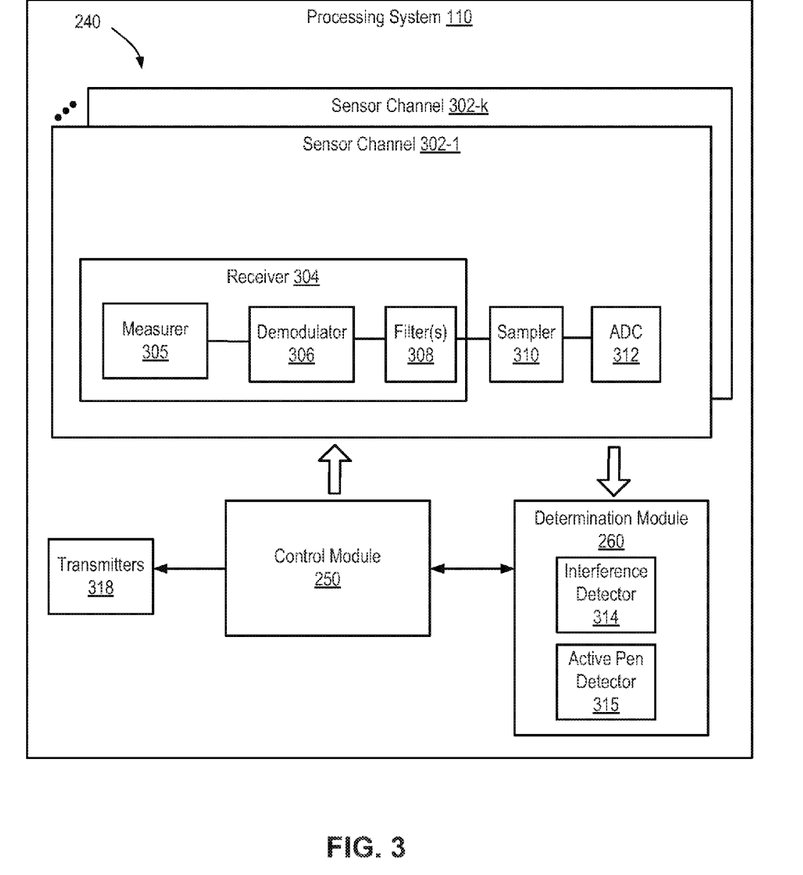
FIG. 3 is a block diagram illustrating the processing system in more detail according to an embodiment.

FIG. 3 is a block diagram illustrating the processing system 110 in more detail according to an embodiment. The processing system 110 includes the sensor module 240, the control module 250, and the determination module 260. The sensor module 240 includes sensor channels 302-1 through 302-k, where k is an integer greater than zero (collectively referred to as "sensor channels 302"). In an embodiment, the sensor module 240 can also include transmitters 318. In another embodiment, the transmitters 318 can be external to the processing system 110. For example, the transmitters 318 can be part of a display controller. In an embodiment, each of the sensor channels 302 includes a receiver 304, a sampler 310, and an analog-to-digital converter (ADC) 312. The receiver 304 includes a measurer 305, a demodulator 306, and filter(s) 308. The determination module 260 can include an interference detector 314.

The sensor channels 302 are coupled to sensor electrodes (shown in FIG. 2). The receiver 304 in each of the sensor channels 302 is coupled to a sensor electrode. The measurer 305 derives a capacitive sensing signal from the sensor electrode coupled to the receiver 304. For example, the measurer 305 can produce the capacitive sensing signal using a charge integrator. The demodulator 306 demodulates the capacitive sensing signal to generate a demodulated signal. The filter(s) 308 filter the demodulated signal. The sampler 310 samples the filtered demodulated signal. The ADC 312 generates digital samples from output of the sampler 310. The determination module 260 processes the digital samples to derive information, such as changes in capacitance and/or interference.

The processing system 110 can include other configurations. For example, the sampler 310 and the ADC 312 can be disposed after the measurer 305, and thus the capacitive sensing signal can be sampled and digitized prior to demodulation and filtering. The demodulator 306 and the filter(s) 308 operate on the capacitive sensing signal in the digital domain, rather than the analog domain (e.g., digital demodulation and digital filtering).

The control module 250 controls each of the sensor channels 302 based on results from the determination module 260. The control module 250 can control the transmitters 318 and/or the sensor channels 302 (e.g., the receivers 304, the demodulators 306, the filters 308, the samplers 310, and the ADCs 312). The control module 250 can operate the transmitters 318 and/or the receivers 304 to obtain capacitive sensing signals using a selected sensing frequency. The control module 250 can adjust the sensor channels 302 and/or the transmitters 318 in response to results of the interference detector 314. For example, the control module 250 can change the selected sensing frequency in response to detection of interference by the interference detector 314 that exceeds a threshold. In another example, the control module 250 can control the sensor channels 302 to enter a high-noise mode in response to detection of interface by the interference detector 314 that exceeds a threshold (e.g., adjustment of the receivers 304, demodulators 306, filters 308, samplers 310, and ADCs 312 to increase sensitivity for a desired signal and attenuate an interference signal).

The determination module 260 determines capacitive baselines and changes in capacitance from the digital samples output by the sensor channels 302. The determination module can determine positional information from the changes in capacitance. The interference detector 314 can analyze the digital samples output by the sensor channels 302 to detect interference. In embodiments described herein, the sensor channels 302 can output digital samples that allow the interference detector 314 to continuously monitor for interference. The interference detector 314 can monitor for interference while the determination module 260 is also processing the samples to determine changes in capacitance. That is, the determination module 260 can monitor for interference concurrently with capacitive sensing.

The determination module 260 can also include an active pen detector 315. In embodiments described herein, the sensor channels 302 can output digital samples that allow the active pen detector 315 to continuously monitor for an active signal transmitted by an active pen. The active pen detector 315 can monitor for the active pen while the determination module 260 is also processing the samples to determine changes in capacitance. That is, the determination module 260 can monitor for the active pen concurrently with capacitive sensing. In embodiments, the determination module 260 can monitor for both interference and an active pen concurrently with capacitive sensing.

Figure 4:
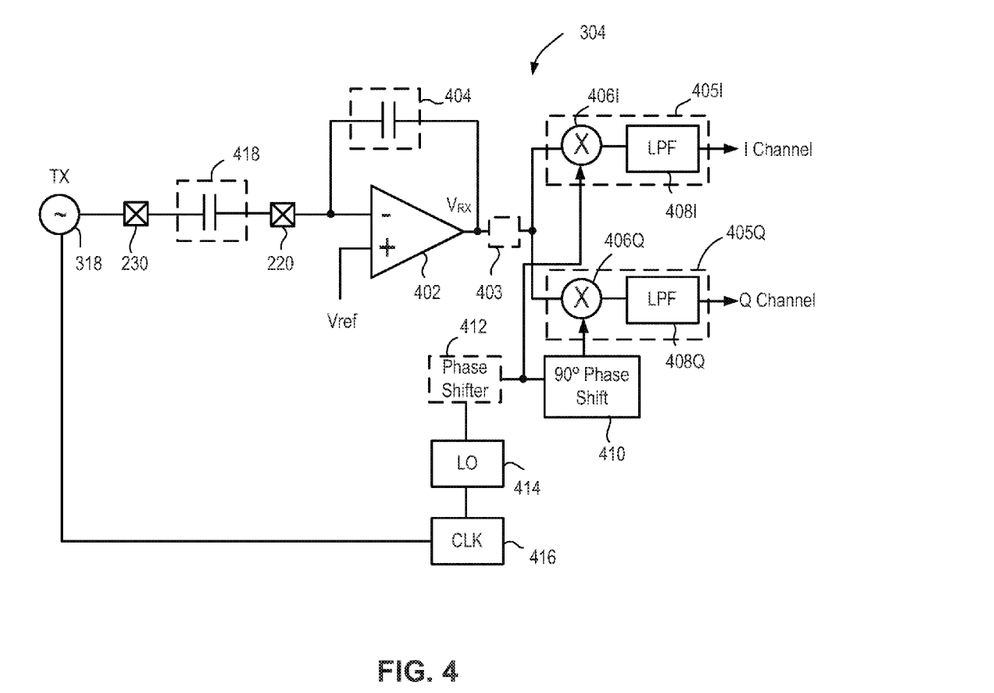
FIG. 4 is a block diagram illustrating the receiver of a sensor channel in more detail according to an embodiment.

FIG. 4 is a block diagram illustrating the receiver 304 of a sensor channel 302 in more detail according to an embodiment. The measurer 305 of the receiver 304 includes an integrating amplifier 402 and a feedback capacitor 404. The demodulator 306 of the receiver 304 includes at least mixers 406I and 406Q (collectively mixers 406), and can include a 90° phase shifter 410, a local oscillator (LO) 414, and a phase shifter 412. Alternatively, one or more of the 90° phase shifter 410, the LO 414, and the phase shifter 412 can be shared circuits coupled to the demodulator 306 the receiver 304 of a plurality of the sensor channels 302. The filter(s) 308 of the receiver 304 include a low-pass filter (LPF) 408I and an LPF 408Q (collectively LPFs 408).

An inverting input of the integrating amplifier 402 is coupled to a sensor electrode 220. A non-inverting input of the integrating amplifier 402 is coupled to a reference voltage (Vref). The reference voltage can be, for example, a substantially constant voltage, such as electrical ground. An output of the integrating amplifier 402 provides a capacitive sensing signal ($V_{RX}$). The feedback capacitor 404 is coupled between the output and the inverting input of the integrating amplifier 402.

For purposes of clarity by example, the receiver 304 is shown within an operating environment for transcapacitive sensing. Thus, the sensor electrode 220 operates as a receiver electrode, which is capacitively coupled to a sensor electrode 230 that operates as a transmitter electrode. A transmitter 318 is coupled to the sensor electrode 230 to drive the sensor electrode 230 with a transmitter signal. The transmitter 318 generates the transmitter signal according to a clock signal generated by the CLK 416. The mutual capacitance between the sensor electrodes 220, 230 is represented by a capacitance 418. While a transcapacitive operating environment is shown, the receiver 304 can also operate in an absolute capacitance sensing environment. In such case: the transmitter 318 and the sensor electrode 230 are omitted from the environment; the capacitance 418 is not a mutual capacitance between sensor electrodes 220, 230, but rather a self-capacitance of the sensor electrode 220; and the non-inverting input of the integrating amplifier 402 is coupled to receive the clock signal of the CLK 416.

First inputs of the mixer 406I and the mixer 406Q are coupled to receive the capacitive sensing signal ($V_{RX}$). A second input of the mixer 406I is coupled to receive a local oscillator signal from the LO 414. A second input of the mixer 406Q is coupled to receive a phase-shifted signal from the 90° phase shifter 410, which is near 90° out of phase with the local oscillator signal. The LO 414 generates the local oscillator signal according to the clock signal from the CLK 416. The frequency of the local oscillator signal is the sensing frequency of the receiver 304. The sensing frequency of the receiver 304 can be changed by changing the frequency of the clock signal generated by the CLK 416.

In some embodiments, the local oscillator signal is a continuous-time signal. The local oscillator signal can be a sinusoidal signal, a square wave signal, a multi-level harmonic-reject signal, or the like. The 90° phase shifter 410 can comprise an RC filter, a Hilbert transform filter, a Weaver mixer, or the like. In other embodiments, the output of the integrating amplifier 402 is coupled to analog-to-digital conversion circuitry 403 (e.g., the sampler 310 and the ADC 312), which provides the capacitive sensing signal ($V_{RX}$). In such case, the demodulator 306 and the filter(s) 308 operate in the digital domain. The local oscillator signal can be a discrete-time signal. The LO 414 can generate the discrete-time local oscillator signal by stepping through a lookup table, for example. The 90° phase shifter 410 can generate the phase-shifted signal by stepping through another lookup table, for example, or by stepping through the same lookup table as used by the LO 414 with an offset. The local oscillator can again be a sinusoidal signal, a square wave signal, a multi-level harmonic-reject signal, or the like within the discrete-time domain.

The sensing frequency can be such that the sensor electrodes 220, 230 operate as transmission lines, and thus the phase of the capacitive sensing signal can be shifted with respect to the phase of the local oscillator signal due to transmission line effects. In some embodiments, the phase shifter 412 is provided to shift the phase of the local oscillator signal and compensate for this global phase shift. The value of the phase shift provided by the phase shifter 412 can be set by the control module 250, for example, after a calibration operation.

The mixer 406I and the LPF 408I comprise an in-phase (I) channel 405I. The mixer 406Q and the LPF 408Q comprise a quadrature (Q) channel 405Q. The mixer 406I mixes the capacitive sensing signal with the local oscillator signal. The local oscillator signal is substantially in-phase with the capacitive sensing signal. The mixer 406I outputs a demodulated signal. The LPF 408I filters the demodulated signal to remove high-frequency components. The I-channel 405I provides an in-phase demodulated signal as output (I-Channel signal). The mixer 406Q mixes the capacitive sensing signal with the phase-shifted signal. The phase-shifted signal is near 90° out of phase with the capacitive sensing signal. The mixer 406Q outputs a demodulated signal. The LPF 408Q filters the demodulated signal to remove high-frequency components. The Q-channel 405Q provides a quadrature demodulated signal as output (Q-Channel signal). In embodiments where the I- and Q-Channel signals are analog, such signals are sampled and digitized to provide I- and Q-samples. In embodiments where the I- and Q-Channel signals are digital, I- and Q-samples are provided as output by the LPFs 408.

Returning to FIG. 3, the determination module 260 is configured to receive I- and Q-samples from each of the sensor channels 302. As described above, for a given sensor channel 302, the capacitive sensing signal is demodulated using a substantially in-phase local oscillator signal. Hence, in a steady-state condition, the I-channel of each of the sensor channels 302 includes the "desired" signal that can be used for capacitive sensing of input object(s). For a given sensor channel 302, the capacitive sensing signal is also demodulated using a phase-shifted signal that is near 90° out of phase with the capacitive sensing signal. Any signal detected on the Q-channel of the sensor channels 302 is, by construction, asynchronous with the desired signal. Hence, measuring a signal on the Q-channel of the sensor channels 302 is tantamount to making a direct interference measurement. For each sensor channel 302, the determination module 260 is configured to measure a change in capacitance in response to a demodulated signal of the I-channel concurrently with measurement of a non-coherent signal in response to a demodulated signal of the Q-channel. The non-coherent signal may comprise effects of interference in the capacitive sensing signal.

In some embodiments, the determination module 260 can include the active pen detector 315, as described above. An active pen comprises a stylus or other type of input object that transmits a signal. The signal transmitted by an active pen can be capacitively coupled to the sensor electrodes and thus appear as a component of the capacitive sensing signal. The signal transmitted by an active pen is asynchronous to the sensor channels 302 (e.g., phase-shifted with respect to the clock signal of the CLK 416). Thus, the determination module 260 can detect the presence of an active pen by detecting the signal transmitted by the active pen in the Q-channels of the sensor channels 302. That is, the non-coherent signals derived from the Q-channels of the sensor channels 302 can include the effects of a signal transmitted by an active pen proximate the capacitive sensing device. In some embodiments, to facilitate detection of an active pen, the LPF 408Q can be configured with a wider bandwidth than the LPF 408I. This would allow the determination module 260 to detect an active pen that transmits a signal having a higher frequency than the sensing frequency.

The control module 250 can mitigate interference based on the non-coherent signals measured by the determination module 260. The control module 250 can take one or more interference mitigation actions in response to the non-coherent signal indicating the presence of interference. For example, the control module 250 can change the sensing frequency, initiate a frequency scan operation to detect a sensing frequency less impacted by interference, initiate a high-noise mode, or the like. The control module 250 can also monitor for an active pen based on the non-coherent signals measured by the determination module 260.

If sinusoidal demodulation is used in the I- and Q-channels of the sensor channels 302, the signal strength in the I-channels will be a function of the phase shift caused by transmission line effects of the sensor electrodes. The determination module 260 can determine capacitance measurements without sensitivity to such phase shift by computing the square root of a sum of squares of the I- and Q-demodulated signals.

Figure 5:
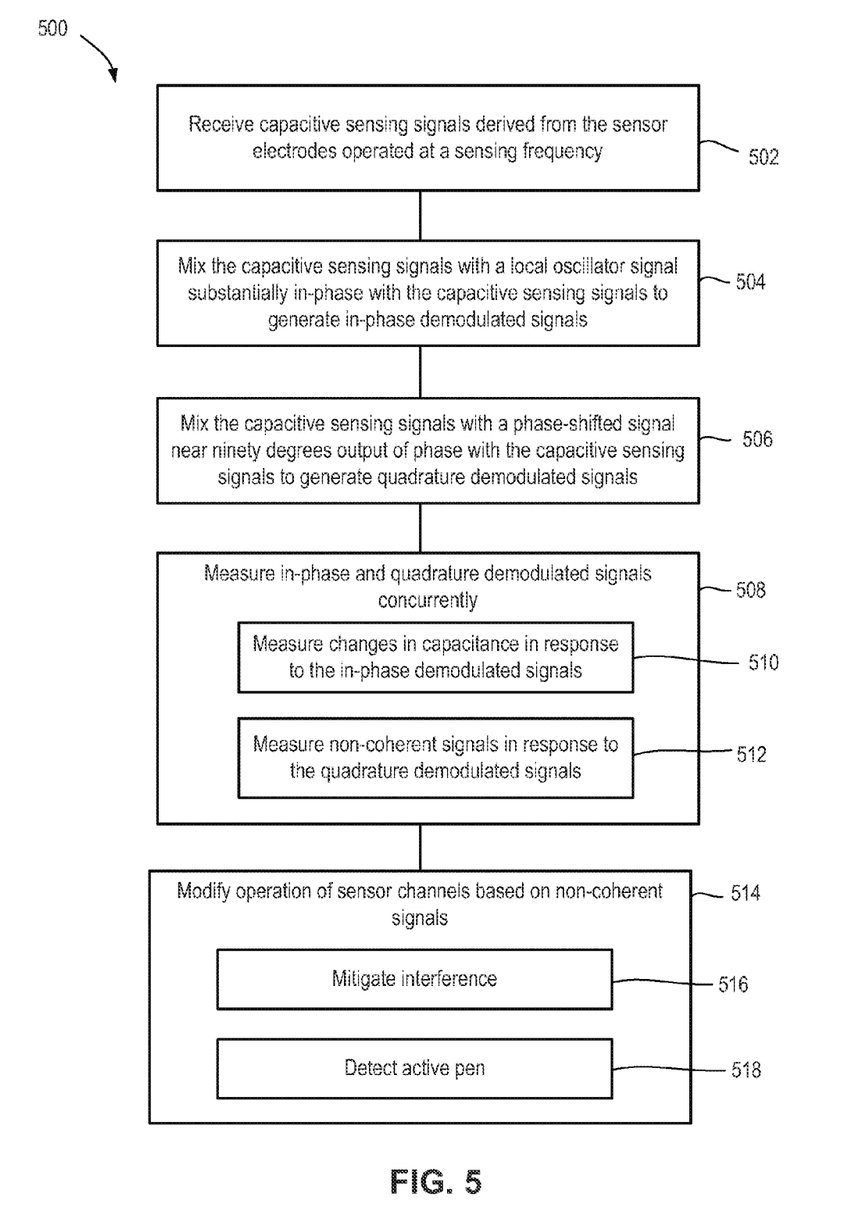
FIG. 5 is a flow diagram depicting a method of operating a capacitive sensing device having a plurality of sensor electrodes according to an embodiment.

FIG. 5 is a flow diagram depicting a method 500 of operating a capacitive sensing device having a plurality of sensor electrodes according to an embodiment.

The method 500 begins at step 502, where the processing system 110 receives capacitive sensing signals derived from the sensor electrodes operated at a sensing frequency. At step 504, the processing system 110 mixes the capacitive sensing signals with a local oscillator signal substantially in-phase with the capacitive sensing signals to generate in-phase demodulated signals. At step 506, the processing system 110 mixes the capacitive sensing signals with a phase-shifted signal near ninety degrees out of phase with the capacitive sensing signals to generate quadrature demodulated signals. At step 508, the processing system 110 measures the in-phase and quadrature demodulated signals concurrently.

Step 508 can include steps 510 and 512. At step 510, the processing system 110 measures changes in capacitance in response to the in-phase demodulated signals (e.g., performs capacitive sensing of input object(s)). At step 512, the processing system 110 measures non-coherent signals in response to the quadrature demodulated signals.

At step 514, the processing system 110 modifies operation of the sensor channels 302 based on the non-coherent signals. Step 514 can include steps 516 and 518. At step 516, the processing system 110 mitigates interference using various techniques described above, such as changing the sensing frequency and/or entering a high-noise mode. At step 518, the processing system 110 detects presence of an active pen.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

What is claimed is:

1. A processing system for a capacitive sensing device, comprising:
  a sensor module coupled to a sensor electrode, and configured to receive a capacitive sensing signal by driving the sensor electrode based on a clock signal having a sensing frequency, the sensor module comprises a receiver including:
    an in-phase channel configured to mix the capacitive sensing signal with a local oscillator signal generated based on the clock signal, having the sensing frequency and being substantially in phase with the capacitive sensing signal; and
    a quadrature channel configured to mix the capacitive sensing signal with a phase-shifted signal generated based on the clock signal, having the sensing frequency and being near ninety degrees out of phase with the capacitive sensing signal; and
  a determination module configured to:
    measure a change in capacitance in response to a demodulated signal output by the in-phase channel; and
    measure a non-coherent signal in response to a demodulated signal output by the quadrature channel concurrently with measuring the change in capacitance, wherein the non-coherent signal comprises effects of interference or effects of a signal transmitted by an active pen proximate the capacitive sensing device, and
  wherein the sensor module is configured to shift the sensing frequency of the clock signal based on the non-coherent signal.

2. The processing system of claim 1, wherein the capacitive sensing signal comprises a sinusoidal signal, and wherein the determination module is configured to measure a change in capacitance using a square root of a sum of squares of the demodulated signals of the in-phase channel and the quadrature channel.

3. The processing system of claim 1, wherein the local oscillator signal comprises a continuous-time signal, and wherein the receiver further comprises a phase-shift circuit configured to generate the phase-shifted signal, the phase-shift circuit comprising one of an RC filter, a Hilbert transform filter, or a Weaver mixer.

4. The processing system of claim 1, wherein the local oscillator signal comprises a discrete-time signal generated by stepping through a lookup table, and wherein the receiver is configured to generate the phase-shifted signal by stepping through another lookup table or by stepping through the lookup table with an offset.

5. The processing system of claim 1, wherein the local oscillator signal comprises one of a sinusoidal signal, a square wave signal, or a multi-level harmonic-reject signal.

6. The processing system of claim 1, wherein the in-phase channel comprises a first mixer configured to mix the capacitive sensing signal with the local oscillator signal and a first low-pass filter configured to filter output of the first mixer, and wherein the quadrature channel comprises a second mixer configured to mix the capacitive sensing signal with the phase-shifted signal and a second low-pass filter configured to filter output of the second mixer.

7. The processing system of claim 6, wherein a bandwidth of the second low-pass filter is different than a bandwidth of the first low-pass filter.

8. The processing system of claim 1, wherein the sensor module is configured to enter a high-noise mode based on the non-coherent signal.

9. The processing system of claim 1, wherein the receiver is configured to shift a phase of the local oscillator signal with respect to a phase of the capacitive sensing signal to compensate for transmission line effects of the sensor electrodes.

10. An input device, comprising:
  a plurality of sensor electrodes;
  a processing system, coupled to the plurality of sensor electrodes, the processing system configured to:
    receive capacitive sensing signals by driving one of the plurality of sensor electrodes based on a clock signal having a sensing frequency;
    mix the capacitive sensing signal with a local oscillator signal generated based on the clock signal, having the sensing frequency and being substantially in phase with the capacitive sensing signal to generate in-phase demodulated signals; and
    mix the capacitive sensing signal with a phase-shifted signal generated based on the clock signal, having the sensing frequency and being near ninety degrees out of phase with the capacitive sensing signal to generate quadrature demodulated signals;

measure changes in capacitance in response to the in-phase demodulated signals;

measure non-coherent signals in response to the quadrature demodulated signals concurrently with measuring the changes in capacitance, wherein the non-coherent signals comprise effects of interference or effects of a signal transmitted by an active pen proximate the input device; and shift the sensing frequency of the clock signal based on the non-coherent signals.

11. The input device of claim 10, wherein the processing system is further configured to enter a high-noise mode based on the non-coherent signals.

12. The input device of claim 10, wherein the processing system is configured to shift a phase of the local oscillator signal with respect to a phase of the capacitive sensing signal to compensate for transmission line effects of the sensor electrodes.

13. A method of operating a capacitive sensing device having a plurality of sensor electrodes, the method comprising:

receiving capacitive sensing signals received from the plurality of sensor electrodes by driving one of the plurality of sensor electrodes based on a clock signal having a sensing frequency;

mixing the capacitive sensing signals with a local oscillator signal generated based on the clock signal, having the sensing frequency and being substantially in-phase with the capacitive sensing signals to generate in-phase demodulated signals;

mixing the capacitive sensing signals with a phase-shifted signal generated based on the clock signal, having the sensing frequency and being near ninety degrees out of phase with the capacitive sensing signals to generate quadrature demodulated signals;

measuring changes in capacitance in response to the in-phase demodulated signals;

measuring non-coherent signals in response to the quadrature demodulated signals concurrently with measuring the changes in capacitance, wherein the non-coherent signals comprise effects of a signal transmitted by an active pen proximate the capacitive sensing device; and shifting the sensing frequency of the clock signal based on the non-coherent signals.

14. The method of claim 13, further comprising:
entering a high-noise mode based on the non-coherent signals.

15. The method of claim 13, further comprising:
shifting a phase of the local oscillator signal with respect to a phase of the capacitive sensing signal to compensate for transmission line effects of the sensor electrodes.

* * * * *